United States Patent Office 3,730,888
Patented May 1, 1973

3,730,888
METHOD OF FLOCCULATING WITH TERTIARY AMINOHYDROXYALKYL ESTERS OF CARBOXYLIC ACID POLYMERS
John D. Buckman, Fred W. Raths, Pamela P. Boggs, and Robert L. Donerson, Memphis, Tenn., assignors to Buckman Laboratories, Inc., Memphis, Tenn.
No Drawing. Filed Apr. 19, 1971, Ser. No. 135,459
Int. Cl. C02b 1/20
U.S. Cl. 210—52     16 Claims

ABSTRACT OF THE DISCLOSURE

High molecular weight, water-soluble tertiary aminohydroxyalkyl esters of carboxylic acid polymers prepared by reacting a glycidyl tertiary amine with a carboxylic acid polymer are useful flocculants.

---

This invention relates to the polymeric art and, more particularly, to novel methods for the preparation of high molecular weight, water-soluble tertiary aminohydroxyalkyl esters of carboxylic acid polymers and their use as flocculants.

Although methods for the preparation of primary and secondary aminoalkyl esters of carboxylic acid polymers have been disclosed in the prior art, the molecular weights of the polymers so produced were relatively low. Generally, the highest molecular weight polymer obtainable by these methods never exceeded 25,000. Attempts to prepare the corresponding tertiary aminoalkyl polymers by the prior art methods with the hope of obtaining a high molecular weight product were less successful. We found that the molecular weights of the tertiary aminoalkyl polymers as prepared were always less than 20,000. This is as expected because when this procedure is followed, a tertiary amine group is an integral portion of the monomeric unit and, as is well known, a tertiary amine group is a chain transfer agent for free-radical polymerizations even when present in small concentrations. Since the molecular weight of a polymer and its effectiveness as a flocculant are directly related, low molecular weight polymers are generally ineffective flocculants in most industrial applications. Even in those few exceptions where not necessary, it is always desirable to employ polymers having significantly higher molecular weights than 25,000.

Although many other polymers having higher molecular weights have been suggested for use as flocculants, none has been entirely satisfactory. Each of these suggested flocculants exhibits one or more of the following disadvantages:

(1) Difficult to dissolve and when dissolved, the resulting solutions are very viscous.

(2) Adversely affected by the presence of metal ions such as $Zn^{++}$, $Ca^{++}$, $Mg^{++}$, or $Al^{+++}$ in the system even at very low concentrations of these ions.

(3) Must be used at high dosages, e.g., about 500–1,000 parts per million to be effective.

(4) Effective over only narrow pH ranges and are often insoluble at neutral or near neutral pH.

It is, therefore, a principal object of the present invention to provide a high molecular weight, water-soluble, tertiary aminohydroxyalkyl ester of a carboxylic acid polymer that obviates the disadvantages of the prior art compositions of this type.

It is another object of our invention to provide a polymer that is an effective flocculant.

It is yet another object of this invention to provide a process whereby water-soluble, tertiary aminohydroxyalkyl esters of carboxylic acid polymers of almost any desired molecular weight can be produced.

It is yet another object of the present invention to provide an effective method for the purification of contaminated water.

These and other objects and advantages will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

In brief, the foregoing objects and advantages are attained by means of a polymer prepared by reacting a glycidyl tertiary amine with a carboxylic acid polymer. Alternately, the polymers of our invention may be prepared by reacting a haloepoxy compound wherein the halogen thereof is attached to the carbon adjacent to the oxirane ring with a secondary amine to form an intermediate product which is then subsequently reacted with an alkali-metal salt of a carboxylic acid polymer.

We have found that the polymeric compositions of our invention of almost any desired molecular weight can be produced by varying the molecular size of each of the various components used in the process. In this respect, the molecular size of the carboxylic acid polymer is the most important and since that is true, the molecular weight of the carboxylic acid polymer will be used as a measure. A suitable molecular weight for this polymer varies from about 10,000 to about 2,000,000; preferably the molecular weight varies from about 20,000 to about 200,000; and more preferably, from about 30,000 to about 100,000. It will be understood, of course, that the molecular weight of the tertiary aminohydroxyalkyl ester of the carboxylic acid polymer will be a multiple of the molecular weight of the carboxylic acid polymer used in the process.

In accordance with the invention, we have found a novel method for preparing water-soluble acid salts of tertiary aminohydroxyalkyl esters of carboxylic acid polymers in the preferred embodiment thereof via the reaction between a glycidyl tertiary amine and the carboxyl groups of a homo- or copolymer containing at least 10 percent of the mers, i.e., the repetitive chemical structural units of a polymer, which are derived from an ethylenically unsaturated carboxylic acid corresponding to the formulae:

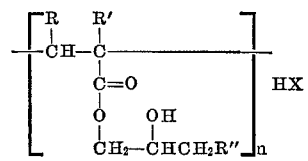

and

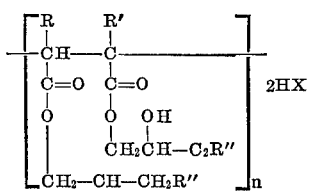

wherein $n$ is an integer greater than 1, R and R' independently represent hydrogen, methyl, or ethyl; R" represents aziridyl, 2,6-dimethyl morpholyl, N-methyl piperazyl, N-2-hydroxyethyl piperazyl, piperidyl, pyrrolidyl, or

wherein Y and Y' independently represent alkyl and hydroxy substituted alkyl groups containing from 2 to 6 carbon atoms, and X represents an acidic anion. It will be understood, of course, that the corresponding free base formulae wherein the HX's are absent are within the scope of our invention.

Stated broadly, the tertiary aminohydroxyalkyl esters of carboxylic acid polymers of our invention possess the following advantageous properties:

(1) Effective as a flocculant:

(a) At low concentrations
    (b) Over a pH range of 1 to 9

(2) Very soluble in water over a pH range of 1 to 9.

(3) Concentrated aqueous solutions have very low viscosities.

(4) Unaffected or enhanced in flocculating activity by the presence of metal ions such as $Ca^{++}$, $Al^{+++}$, and the like.

Before proceeding with specific examples illustrating our invention, it may be well to indicate in general the type of materials useful in preparing the compositions of our invention.

The carboxylic acid polymers which are utilized in this invention may comprise either homopolymers of ethylenically unsaturated carboxylic acids such as acrylic acid, methacrylic acid, crotonic acid, ethacrylic acid, fumaric acid, maleic acid, and itaconic acid or copolymers containing carboxylated mers which are derived from any of the latter ethylenically unsaturated carboxylic acids. The comonomers which may be used in preparing the applicable copolymers of these ethylenically unsaturated carboxylic acids include other ethylenically unsaturated monomers, i.e., vinyl comonomers, such as acrylonitrile, acrylamide, methyl vinyl ether, ethyl vinyl ether, methacrylamide, the lower alkyl esters of acrylic acid and methacrylic acid, hydroxypropyl acrylate, hydroxypropyl methacrylate, hydroxyethyl acrylate, hydroxyethyl methacrylate, vinyl acetate, and vinyl alcohol, etc.

Optimum results in the process of our invention are attained by the use of ethylenically unsaturated monocarboxylic acids such as acrylic acid.

The glycidyl tertiary amines which are applicable for use in our invention are those identified by the formula:

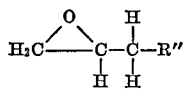

wherein R'' represents a group as previously noted.

If the alternative procedure is employed in preparing the polymers of our invention, suitable haloepoxy compounds are those in which the halogen thereof is attached to the carbon adjacent to the oxirane ring. Epichlorohydrin, because it is readily and economically available in sufficient quantities for all anticipated industrial needs, is generally preferred. Other halohydrins that may be used include epibromohydrin, epiiodohydrin, and other vicinal halohydrins such as 1,2-epoxy-3-chlorobutane, 1, 2-epoxy-3-bromobutane, 1,2-epoxy-3-chloropentane, 1,2-epoxy-3-bromopentane, etc.

Suitable secondary amines for reaction with the epoxy compound include almost any secondary amine such as, but not limited to, piperidine, pyrrolidine, aziridine, 2,6-dimethylmorpholine, N-methylpiperazine, N-2-hydroxyethylpiperazine and those identified by the formula

wherein Y and Y' represent a group as previously noted.

The above described homo- and copolymers of ethylenically unsaturated carboxylic acids may be prepared by means of free-radical initiated polymerization techniques which are well known to those skilled in the art. Since the ultimate polymeric derivatives are to be used in the form of their aqueous solutions, it is more convenient to prepare these carboxylic acid polymers in the form of their aqueous solutions which should, preferably, have a range of resin solids content of from about 10 to 50 percent by weight. If desired, an inert organic solvent such as methanol or ethanol may be substituted for water.

The products resulting from the process of this invention should have, preferably, at least 10 mole percent of their mers aminoalkylated as previously described. Thus, where homopolymers of carboxylic acids are utilized in the reaction, it is preferable that at least 10 mole percent of the mers undergo the aminoalkylation reaction. Where copolymers of ethylenically unsaturated carboxylic acids with one or more vinyl comonomers are employed, such copolymers will therefore have to contain at least 10 mole percent of carboxylated mers so that in the aminoalkylated derivaties derived therefrom, there will be at least 10 mole percent of aminoalkylated mers. Naturally, if desired, such copolymers can contain more than 10 mole percent of carboxylated mers.

The tertiary aminohydroxyalkyl esters resulting from the process of this invention are water soluble or may be converted easily to water-soluble acid salts. Thus, it may in some cases be necessary to include a neutralizing acid in the reaction mixture wherein these derivatives are being synthesized. For this purpose, any inorganic or organic acid capable of yielding a water-soluble salt may be employed; for example, hydrochloric, hydrobromic, sulfuric, phosphoric, nitric, acetic, formic, propionic, butyric, citric, and similar acids.

The actual procedure to be used in preparing these water-soluble polymeric derivatives by means of the novel process of this invention involves reaction of a tertiary glycidyl amine with a polymer comprising carboxylic acid groups as illustrated in Equation 1.

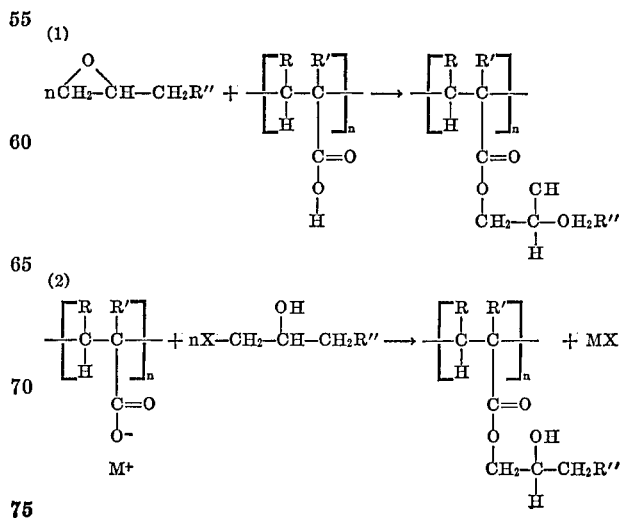

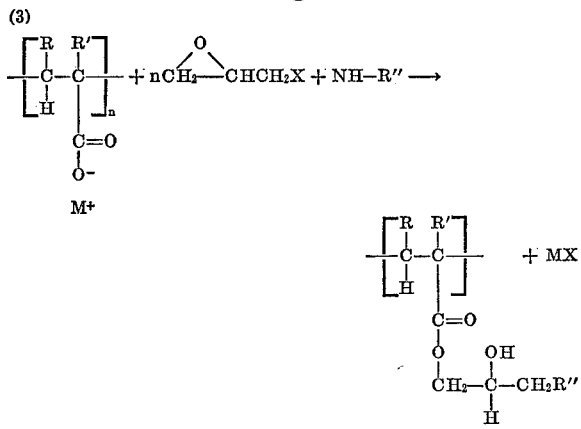

Although the prior art details the extreme difficulty and incompleteness of the reaction of epoxides with even monomeric carboxylic acids, we have found that the reaction proceeds smoothly and with completion (Equation 1) in an aqueous system when the epoxide is a glycidyl amine. An alternative procedure to the preparation of the glycidyl amine as illustrated in Equation 1 and Example 1 involves preparation of the tertiary amine halohydrin with subsequent generation of the glycidyl amine by reaction of the tertiary amine halohydrin with an alkali-metal ($M^+$) salt of the polymers comprising carboxylic acid groups, as illustrated in Equation 2 and Examples 2 and 3. An alternative to preparation and isolation of either the glycidyl tertiary amine or the tertiary amine halohydrin involves simply adding an epihalohydrin to a mixture of the secondary amine and an alkali-metal ($M^+$) salt of the polymers comprising carboxylic acid groups resulting in the formation in situ of first the tertiary amine halohydrin and subsequently the glycidyl tertiary amine, as illustrated in Example 4.

The actual procedure to be used in the preparation of these water-soluble derivatives by means of the novel processes of this invention involves (1) adding with agitation the glycidyl tertiary amine to an aqueous solution of the polycarboxylic acid, (2) adding the tertiary amine halohydrin to an aqueous solution of an alkali-metal salt of the polycarboxylic acid, or (3) adding the epihalohydrin to an aqueous solution of the secondary amine and an alkil-metal salt of the polycarboxylic acid in the temperature range of 10–70° C., and then heating the reaction mixture in the temperature range of 50–100° C. until such time as the reaction is completed. Completion of the ester formation may be immediately followed, if desired, by neutralization of the tertiary amine ester by addition of a suitable acid.

The polymeric compositions of our invention are useful as drainage aids, formation aids, retention aids, and as strength improving agents for paper and paperboard. These compositions are also useful as flocculants in the clarification of incoming water supplies and industrial and municipal effluents. In particular, the new compositions may be used in recovery of the valuable materials remaining in the process waters of paper and pulp manufacture, thereby also alleviating the pollution problems of the industry.

The polymeric compositions of our invention are also useful as scale control agents and sludge conditioners in process water systems.

These polymeric compositions according to the invention can also be used to remove dissolved or solid particulate matter remaining in the water before it is discharged, even though such matter is not of a character suitable for use but must be disposed of by microbiological decomposition or combustion, or buried in a sanitary fill.

These polymeric compositions according to the invention are also useful in the treatment of incoming water supplies. These new compositions are fast-acting flocculants, compatible with alum and iron salts. Hence they may be used in the treatment of incoming water supplies as a supplement to low cost alum or iron salts, thus achieving a reduction in process time in addition to the desired degree of completeness in the removal of finely divided or dissolved solids. Similar principles apply to the removal of dissolved and particulate matter from water discharged as industrial or municipal effluents.

The polymers of our invention are also useful in applications such as corrosion inhibitors, detergents, wetting agents, and spinning aids; accelerators for curing various plastics, liquid-solid separations in gas scrubber water from steel blast furnaces, and the separation of tailings and fines from minerals in ore processing; and in the manufacture of ion exchange resins.

According to a still further feature of the invention, there is provided a method of flocculating solids from an aqueous system which comprises adding to the aqueous system one or more of these polymers as hereinbefore described in an amount sufficient to cause fluocculation of the solids.

In the use of the water-soluble polymers of the invention as flocculants, one or more may be added to a given aqueous suspension with sufficient agitation to insure uniform distribution. Following this treatment, the flocculated aggregates will settle. The amount of the water-soluble polymers according to the invention necessary to produce the desired result is highly variable depending on the amount and nature of the particulate matter on which an effect is needed as well as the other components of the ionic environment in which the polymers and particulate matter are present. Suitable quantities of the polymers of this invention may vary from as low as 0.1 part per million based on the total weight of water and particulate matter to as high as 25 parts per million on the same basis with a preferred range of from 0.5 to 5 parts per million.

The polymers of this invention may be added to papermaking systems producing various types of paper and paperboard with beneficial results.

According to yet a further feature of the invention, there is provided a process for the preparation of paper or paperboard wherein an aqueous fluid containing cellulosic pulp and other papermaking ingredients is formed into a sheet on a Fourdrinier wire cloth, one or more of the polymers of this invention being added to the aqueous fluid before the furnish contacts the fourdrinier wire cloth.

When the polymers of the invention are used as papermaking aids, one or more of them may, for example, be added continuously to the paper machine system at suitable locations such as at the machine chest, the fan pump, or the headbox. The desirable results obtained by using this process may be summarized as follows:

(1) Increased production per unit of equipment.
(2) Improved formation and strength properties of paper and paperboard.
(3) Increase in overall mill efficiency in that losses of fines such as fine fibers, pigments, fillers, and other paper components are minimized by increasing retention of these products in paper and paperboard.
(4) Alleviation of water pollution problems.

In order to disclose the nature of the present invention still more clearly, the following illustrative examples will be given. It is to be understood, however, that the invention is not to be limited to the specific conditions or details set forth in these examples except insofar as such limitations are specified in the appended claims.

EXAMPLE 1

A glass reaction flask was charged with 379 grams (0.5 mole) of a 12.3 percent sodium polyacrylate-water solution which was neutralized to pH 3 with 46 grams of concentrated hydrochloric acid. (The sodium polyacrylate solution had a viscosity of 239 centipoises at 25° C. as a 22 percent aqueous solution.) To the stirred solution at room temperature was added 65 grams (0.5 mole) of 1-diethylamino-2,3-epoxypropane [prepared as described in the Jour. of Amer. Chem. Soc. 68: 1292 (1946)]; an exothermic reaction occurred and the temperature rose to 41° C. The reaction mixture was heated to 75-80° C. for thirty minutes, cooled, and 0.5 mole of nitric acid was added. The resulting solution was effective as a flocculant.

EXAMPLE 2

Into a one-liter round bottomed flask equipped with a mechanical stirrer and a thermometer was placed 315 grams (3.0 moles) of diethanolamine. With stirring, 277.5 grams (3.0 moles) of epichlorohydrin was added over a period of three hours and at such a rate so as not to exceed 30° C. The reaction mixture was stirred an additional hour at room temperature to give 3-chloro-2-hydroxypropyl diethanolamine containing 0.96 percent ionic chloride.

EXAMPLE 3

A glass reaction flask was charged with 43.7 grams (0.1 mole) of a 21.5 percent sodium polyacrylate-water solution and 19.9 grams (0.1 mole) of 3-chloro-2-hydroxypropyl diethanolamine. (The sodium polyacrylate solution had a viscosity of 294 centipoises at 25° C. as a 22 percent aqueous solution.) The stirred reaction mixture was heated at 80-85° C. for two hours, cooled, and the reaction mixture was divided into two equal portions. One portion was tested "as is" and the other was neutralized with 4.5 grams (0.05 mole) of concentrated nitric acid prior to testing. Both portions were effective fluocculants.

EXAMPLE 4

A glass reaction flask was charged with 42.6 grams (0.1 mole) of sodium polyacrylate-water solution, 10.5 grams (0.1 mole) diethanolamine, and 42.0 grams water. (The sodium polyacrylate solution had a viscosity of 226 centipoises at 25° C. as a 22 percent aqueous solution.) To this stirred mixture was added dropwise 9.2 grams (0.1 mole) of epichlorohydrin. The reaction mixture was cooled with an ice bath in order to maintain 25-30° C. during the 5-minute addition of epichlorohydrin. When the addition was complete, the reaction mixture was stirred at 25-30° C. for 30 minutes and then refluxed for two hours. A sample was analyzed for ionic chloride and 3.4 percent chloride was found. Theory was 3.4 percent chloride. The reaction mixture was neutralized with concentrated nitric acid and the resulting mixture was an effective flocculant.

EXAMPLE 5

The same experimental procedure as used in Example 1 for the preparation of N-glycidyl diethanolamine was used to prepare N-glycidyl aziridine, N-glycidyl morpholine, N-glycidyl piperidine, and N-glycidyl diisopropylamine.

EXAMPLE 6

In this example, the experimental procedure of Example 1 was followed wherein N-glycidyl aziridine, N-glycidyl morpholine, N-glycidyl piperidine, and N-glycidyl diisopropylamine were individually substituted for N-glycidyl diethanolamine. The four products so obtained were effective flocculants.

EXAMPLE 7

A glass reaction flask was charged with 42.6 grams (0.1 mole) of a 22 percent sodium polyacrylate-water solution, 63.9 grams water, and 18.0 grams (0.1 mole) of 3-chloro-2-hydroxypropyl morpholine. (The sodium polyacrylate solution had a viscosity of 226 centipoises at 25° C. as a 22 percent aqueous solution.) The stirred reaction solution was heated at reflux for two hours, cooled, and neutralized with an equivalent amount of concentrated nitric acid. The resulting product was an effective flocculant.

EXAMPLE 8

In this example, the experimental procedures of Examples 1, 6, and 7 were repeated wherein polymethacrylic acid and the alkali-metal salts thereof, and copolymers of acrylic and methacrylic acids with acrylamide acrylonitrile, hydroxyethyl acrylate, hydroxypropyl acrylate, hydroxyethyl methacrylate, and hydroxypropyl acrylate were individually substituted for polyacrylic acid or sodium polyacrylate. All of the products so prepared were effective flocculants.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A method of flocculating solids from an aqueous system containing suspended or dissolved solids which comprises adding to said aqueous system a flocculant comprising a high molecular weight, water-soluble, tertiary aminohydroxyalkyl ester of a carboxylic acid polymer in an amount sufficient to cause the flocculation of said solids.

2. The method of claim 1 wherein the flocculant is a mixture comprising alum and a high molecular weight, water-soluble, tertiary aminohydroxyalkyl ester of a carboxylic acid polymer.

3. The method of claim 1 wherein the flocculant is a mixture comprising an iron salt and a high molecular weight, water-soluble, tertiary aminohydroxyalkyl ester of a carboxylic acid polymer.

4. The method of claim 1 wherein the high molecular weight, water-soluble, tertiary aminohydroxyalkyl ester of a carboxylic acid polymer contains the repeating formula:

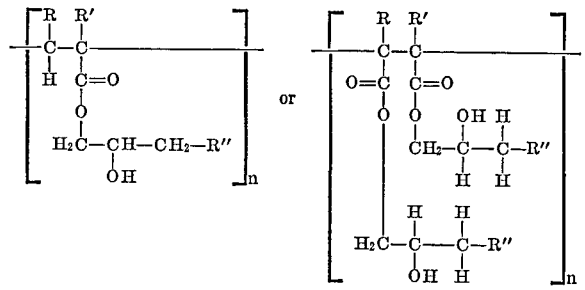

wherein $n$ is an integer greater than 1; R and R' independently represent hydrogen, methyl, or ethyl, and R" represents aziridyl, 2,6-dimethyl morpholyl, N-methyl piperazyl, N-2-hydroxyethyl piperazyl, piperidyl, pyrrolidyl, or

wherein Y and Y' independently represent alkyl and hydroxy substituted alkyl groups containing from 2 to 6 carbon atoms.

5. The method of claim 1 wherein the high molecular weight, water-soluble, tertiary aminohydroxyalkyl ester of a carboxylic acid polymer contains the repeating formula:

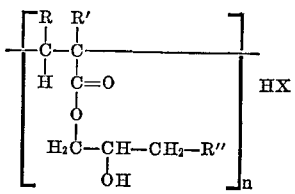

or

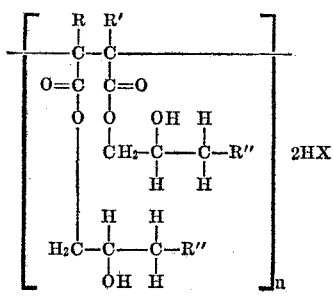 2HX wherein $n$ is an integer greater than 1; R and R' independently represent hydrogen, methyl, or ethyl, and R'' represents aziridyl, 2,6-dimethyl morpholyl, N-methyl piperazyl, N-2-hydroxyethyl piperazyl, piperidyl, pyrrolidyl, or

wherein Y and Y' independently represent alkyl and hydroxy substituted alkyl groups containing from 2 to 6 carbon atoms; and X represents an acidic anion.

6. The method of claim 1 wherein the acid portion of the ester used is an ethylenically unsaturated monocarboxylic acid polymer.

7. The method of claim 1 wherein the acid portion of the ester used is a polyacrylic acid.

8. The method of claim 1 wherein the acid portion of the ester used is a polymethacrylic acid.

9. The method of claim 1 wherein the acid portion of the ester used is a copolymer of acrylic acid and acrylamide.

10. The method of claim 1 wherein the acid portion of the ester used is a copolymer of methacrylic acid and acrylamide.

11. The method of claim 1 wherein the alcohol portion of said ester is 2-hydroxy-3-diethanolaminepropanyl.

12. The method of claim 1 wherein the alcohol portion of said ester is 2-hydroxy-3-diethylaminopropyl.

13. The method of claim 1 wherein the alcohol portion of said ester is 2-hydroxy-3-morpholylpropanyl.

14. The method of claim 1 wherein the alcohol portion of said ester is 2-hydroxy-3-piperidylpropanyl.

15. The method of claim 1 wherein the alcohol portion of said ester is 2-hydroxy-3-diisopropylaminopropanyl.

16. The method of claim 1 wherein the alcohol portion of said ester is 2-hydroxy-3-diisopropanolaminopropanyl.

References Cited
UNITED STATES PATENTS

| | | | |
|---|---|---|---|
| 3,428,617 | 2/1969 | Sobolev | 260—89.5 X |
| 3,008,851 | 11/1961 | Zeitchel et al. | 260—80.3 NX |
| 3,023,162 | 2/1962 | Fordyce et al. | 210—54 |

MICHAEL ROGERS, Primary Examiner

U.S. Cl. X.R.

260—80.3 89.1